United States Patent
Pham

(10) Patent No.: US 6,170,847 B1
(45) Date of Patent: Jan. 9, 2001

(54) HIGH PERFORMANCE FULLY-ENCLOSED CENTER-TRACKING VEHICLE

(76) Inventor: Roger N. C. Pham, 2909 Socrates, Grand Prairie, TX (US) 75052

( * ) Notice: Under 35 U.S.C. 154(b), the term of this patent shall be extended for 0 days.

(21) Appl. No.: 09/505,084

(22) Filed: Feb. 16, 2000

Related U.S. Application Data

(62) Division of application No. 09/093,625, filed on Jun. 6, 1998, now Pat. No. 6,056,078.
(60) Provisional application No. 60/049,118, filed on Jun. 10, 1997.

(51) Int. Cl.[7] .................................................. B62H 1/10
(52) U.S. Cl. ........................ 280/298; 280/755; 180/219; 180/209
(58) Field of Search ..................................... 280/293, 298, 280/299, 300, 767, 755; 180/219, 209

(56) References Cited

U.S. PATENT DOCUMENTS

| | | | |
|---|---|---|---|
| D. 158,132 | * | 4/1950 | Salisbury . |
| 1,796,339 | * | 3/1931 | Nicholson . |
| 1,858,743 | * | 5/1932 | Langstreth . |
| 3,980,150 | * | 9/1976 | Gigli ..................................... 180/209 |
| 4,133,402 | * | 1/1979 | Soo Hoo . |
| 4,313,511 | * | 2/1982 | Soo Hoo . |
| 5,029,894 | * | 7/1991 | Willman ................................ 280/755 |
| 5,048,864 | * | 9/1991 | Geiger .................................. 280/755 |
| 5,378,020 | * | 1/1995 | Horn .................................... 280/755 |
| 5,401,055 | * | 3/1995 | Pham .................................... 280/755 |

* cited by examiner

Primary Examiner—Kevin Hurley

(57) ABSTRACT

A two-seat center-tracking motor vehicle with a narrow body completely enclosing the occupants designed for maximum compactness, energy efficiency, high performance in term of acceleration, speed and maneuverability, and maximum protection of the occupants. The vehicle has two primary road wheels arranged in tandem, and is stabilized at low speeds by a pair of ski-rollers attached to a pair of outrigger struts which are tucked within the width of the body during normal operation. The outrigger struts may be swung outward to widen the base of support when necessary in adverse condition, and they are also capable of lifting the vehicle upright should it fall flat on its side. Suspension and actuation of the outrigger mechanism is by oleo-pneumatic principle. The rear seat is faced rearward, the rear leg room shares space with the centerlined-mounted rear wheel, and the engine is placed between the front and the rear seat to achieve: 1) the most aerodynamic profile possible 2) maximum protection of the occupants, and, 3) maximum reduction in the length and height of the vehicle.

17 Claims, 3 Drawing Sheets

HIGH PERFORMANCE FULLY-ENCLOSED CENTER-TRACKING VEHICLE

This is a division of Ser. No. 09/093,625 Filed Jun. 6, 1998 now U.S. Pat. No. 6,056,078, which claims benefit of 60/049,118 filed Jun. 10, 1997.

BACKGROUND OF THE INVENTION

1. Field of the Invention

This invention relates to efficient, safe and comfortable 2-seat vehicles for daily personal transportation, and particularly, to the use of center-tracking vehicle with retractable support side wheels to prevent turning over during normal use and during collision. More specifically, the major emphases of this particular 2-seat vehicle will be on the minimal utilization of roadway and parking spaces to fight traffic congestion as well as low aerodynamic drag and low curb weight for much improved fuel efficiency and low exhaust emission.

2. Description of the Prior Art

Two-wheeled, or center-tracking vehicles, such as bicycles and motorcycles have long been commercially used to achieve the above mentioned objectives. However, it is obvious that they do not offer the level of comfort and protection, both from the weather elements and during event of a collision, acceptable to the general public in more developed countries. Furthermore, touring motorcycles do not offer a significant improvement in gas mileage in comparison to an economy sized automobile, because of their lack of aerodynamic efficiency imposed by the fully-exposed body of the rider.

Full-bodied center-tracking vehicles have been described in various patents. These vehicles require means for stabilization against falling-over when stopped, moving at low speeds, or when moving on wet or otherwise slippery roadways, the latter condition cause tire slip to occur.

One prior art technique of stabilizing single track vehicles is to use a large passive gyro and utilize its precessional moment to control body roll. In U.S. Pat. No. 3,465,840 to Summers for example, the vehicle is stabilized against rolling over by a large brute force gyro having a lateral spin axis and a vertical gimbal axis. Roll equilibrium is maintained by application of a vehicle righting gimbal force as a function of gimbal precession rate. Gimbal drift resulting in gimbal displacement is erased by application of a drift correcting gimbal torque in the direction of the displacement. While the method disclosed in Summers has met with some success in stabilizing large ships, the weight, expense and complexity of this method have barred two wheeled vehicles from using the method in an economical manner.

A second type of stabilizing method which has been described in previous patents uses retractable outrigger wheels of various designs and mechanisms. U.S. Pat. No. 3,700,059 to Sutton discloses a vehicle stabilizing system wherein the outrigger wheels can be steered in the direction of travel, rotated to meet road speed and raised or lowered through an electromechanical system. Drawbacks to this design involve its great mechanical complexity thus increasing manufacturing cost, its completely exposed outrigger wheels mechanism along both sides of the vehicle, thus taking up almost as much road space as a conventional automobile thus offering no advantage in term of space saving ability, and furthermore, the fully exposed outrigger mechanism creates a large amount of wind drag thus offering little advantage in fuel economy over that of an economy car.

In U.S. Pat. No. 4,513,837 to Archer, the outrigger device is completely retractable upward in the vehicle's body cleanly. However, this cleanly upward retractable mechanism can only permit a narrow outrigger support track which makes the vehicle vulnerable to rolling over in slippery road condition or at high banking angle, and once the vehicle is rolled over on its side, there is no mechanism built in that can immediately right itself up, thus creating a very vulnerable situation where it can be run over by other cars. Furthermore, Archer's outrigger mechanism is placed not in the same saggittal plane with the center of gravity (CG) of the vehicle where it would exert the most effect, but instead is placed behind the CG, in line with the rear drive wheel, where it would have decreased stabilizing effect.

In U.S. Pat. No. 4,691,798 to Engelbach, the outrigger mechanism is attached to the vehicle frame where it pivots upward when retracted and downward when deployed, and those described actions are coupled to an automatic system controlled by a microprocessor guided by a rate gyro sensor. While no mechanical details regarding the construction of such an outrigger mechanism was described in this patent, it is clear that an outrigger system of sufficient track width for satisfactory stabilization when pivoting up to down or vice-versa on both side of the vehicle can interfere with traffic on either side of the vehicle, therefore limiting this vehicle's utility in the solution for an ever-increasing traffic congestion problem. And, like the previously-described invention, this design's outrigger system is also placed in line with the rear wheel of the vehicle, thereby limiting its stabilizing authority.

In U.S. Pat. No. 4,133,402, a simple outrigger assembly of narrow track base was described attached to the rear wheel of the vehicle, and therefore, as in the two previous patents, its stabilizing ability is limited.

In U.S. Pat. No. 5,048,864 by Geiger dated Sep. 17, 1991, a similar outrigger system was described which was very much similar to that of Archer's in that the outrigger system is placed transversely in-line with the rear wheel and not near the center of gravity of the vehicle thus significantly limiting its stabilizing authority. Furthermore, this patent requires the width of the vehicle to be nearly as much as that of a sub-compact size car (51 inches or 129.5 cm versus 60 inches or 152 cm) for adequate stability hence offers little advantage in term of road saving ability.

In my previous U.S. Pat. No. 5,401,055 (Pham), a center-tracking vehicle capable of carrying two occupants are disclosed which can overcome the aforementioned limitations of the prior arts. However, this vehicle design as illustrated does not represent the optimum in aesthetic, aerodynamic efficiency, space efficiency, cost of production, maintenance and ease and reliability in daily operation. The use of pneumatic actuators in my past design requires high pressure compressed air which is prone to leakage and is energy-consuming to produce. Furthermore, my past design requires a large outrigger telescopic strut in order to house the entire outrigger wheel in order to retract the outrigger wheel past the center of gravity of the vehicle. This previous design requires a separate pneumatic actuator for retracting the outrigger wheel. To reduce the length of this previous vehicle, the driver is required to sit fairly high, on top of the flat engine. This increases the vehicle height and hence vehicle's profile area, and developing a new flat engine and separately rear-mounted transmission for this vehicle requires major development expenses. To reduce the vehicle's profile area, the top area above the rear passenger is removable, but this requires extra effort, thus not very ergonomically appealing. Therefore, my previous design is heavy, expensive, ergonomically undesirable and prone to failure.

My new design that is herein disclosed will represent a major improvement in all of the above aspects, with emphasis on simplicity and reliability of the outrigger mechanism and of the engine-transmission arrangement, on practicalities such as ease of entry and exit with automobile's style doors, and improved aerodynamics and aesthetics. The new design uses an off-the-shelf in-line motorcycle engine-transmission unit that requires almost no developmental expenses. Its outrigger struts are very simple hydraulic actuators that are much more resistant to leakage than the pneumatic actuators, and its ski-rollers at the end of the outrigger struts can be easily retracted above the vehicle's center of gravity in order to lift the vehicle upright should it fall on its side. The ski-roller provide stable support for parking in soft surfaces such as snow, sand, gravel, mud or grass while a typically small-size outrigger wheel would be more likely to sink, making the vehicle liable to fall over.

A very important advantage of the herein-disclosed design over the prior arts is in the location of vehicle's engine-transmission unit and seating arrangement. Most of prior art designs feature a single-seat vehicle, with the engine usually located behind the seat. This is done in order to keep the vehicle's length and height, hence the vehicle's profile area to a minimum. Otherwise, a lengthy 2-seat vehicle would have poor maneuverability and would take up too much parking space, and a light-might vehicle with too much profile area would be very unstable in strong cross wind. In a four-wheeled automobile, the engine is located in either in front or at the rear, transversely inline with the front wheels or rear wheels, thus allowing reduction in the vehicle's length. In a center-tracking vehicle, the primary road wheels must be placed in the center line in tandem relationship, the engine then must be placed either in front or behind the primary road wheel, thus making the vehicle much longer than an automobile if the vehicle is to have two tandem seats for carrying two occupants. A few of the prior art designs that feature a two-seat center-tracking vehicles are either too tall because the occupants seat above the engine-transmission assembly in motorcycle fashion (J. Pattner, 2,589,023), or too long because the engine-transmission assembly is placed behind the rear seat (Hom, 5,181,740).

SUMMARY AND OBJECTIVES OF THE INVENTION

The principal objective of this invention is to produce a personal motor vehicle capable of carrying two full-sized adults completely enclosed in full comfort, yet sufficiently narrow in width such that two of it can occupy only a single lane of traffic, and sufficiently compact in length such that its length is even less than that of a subcompact automobile, for maximum maneuverability and saving of roadway space and parking space. This vehicle will easily lend itself to the lowest aerodynamic drag coefficient and frontal area as well as curb weight using conventional low cost materials in order to produce fuel efficiency three to four times that of modern automobiles with a responding reduction in exhaust pollution when using petroleum fuel. The use of alternative fuels or electricity on these vehicles in large scale, which is easier to be made practical due to their far greater energy efficiency, will bring exhaust pollution to near zero.

The both of the vehicle's occupants will be completely enclosed and protected from the weather and during collision by a strong and rigid body with provision for complete air conditioning comfort as well as noise protection.

When stationary or when moving at slow speed, the vehicle will be supported in the upright position by a pair of ski-rollers attached to outrigger struts that are positioned within the vehicle's width in order to save roadway and parking space. This narrow outrigger wheel track can be rapidly widened by the driver when driving over rough, uneven terrain or when encountering slick or icy roads, or in case of high cross wind, in order to improve stability. When the vehicle accidentally falls completely flat on its side, this mechanism can also immediately turn the body upright in order to protect the driver from being run over by other vehicles, or in order for the driver to regain control of the vehicle. During a high speed high banking turn, the driver may elect to deploy this mechanism partially in order to prevent excessive banking and hence lost of control (during a motorcycle race, the rider lowers and extends his corresponding knee during a high speed high banking turn to achieve this same purpose). During normal operation, when the vehicle reaches a speed that the driver can stabilize it solely via the steering mechanism (as in a bicycle ) the outrigger wheels will be retracted upward in order to give the driver complete freedom to maneuver.

The vehicle's length and height is kept to a mininum by an unique engine-transmission and seating arrangement. Specifically, the engine-transmission unit is placed between the front and the rear seat. The rear seat is faced rearward thereby bringing the heads of the front and rear occupant together, allowing for a nice downward-sloping of the rear portion of the vehicle's roof for reduction of the vehicle's profile while enhancing aerodynamic efficiency and aesthetics.

DETAILED DESCRIPTION OF THE PREFERRED EMBODIMENT

Overview

Figure 1:
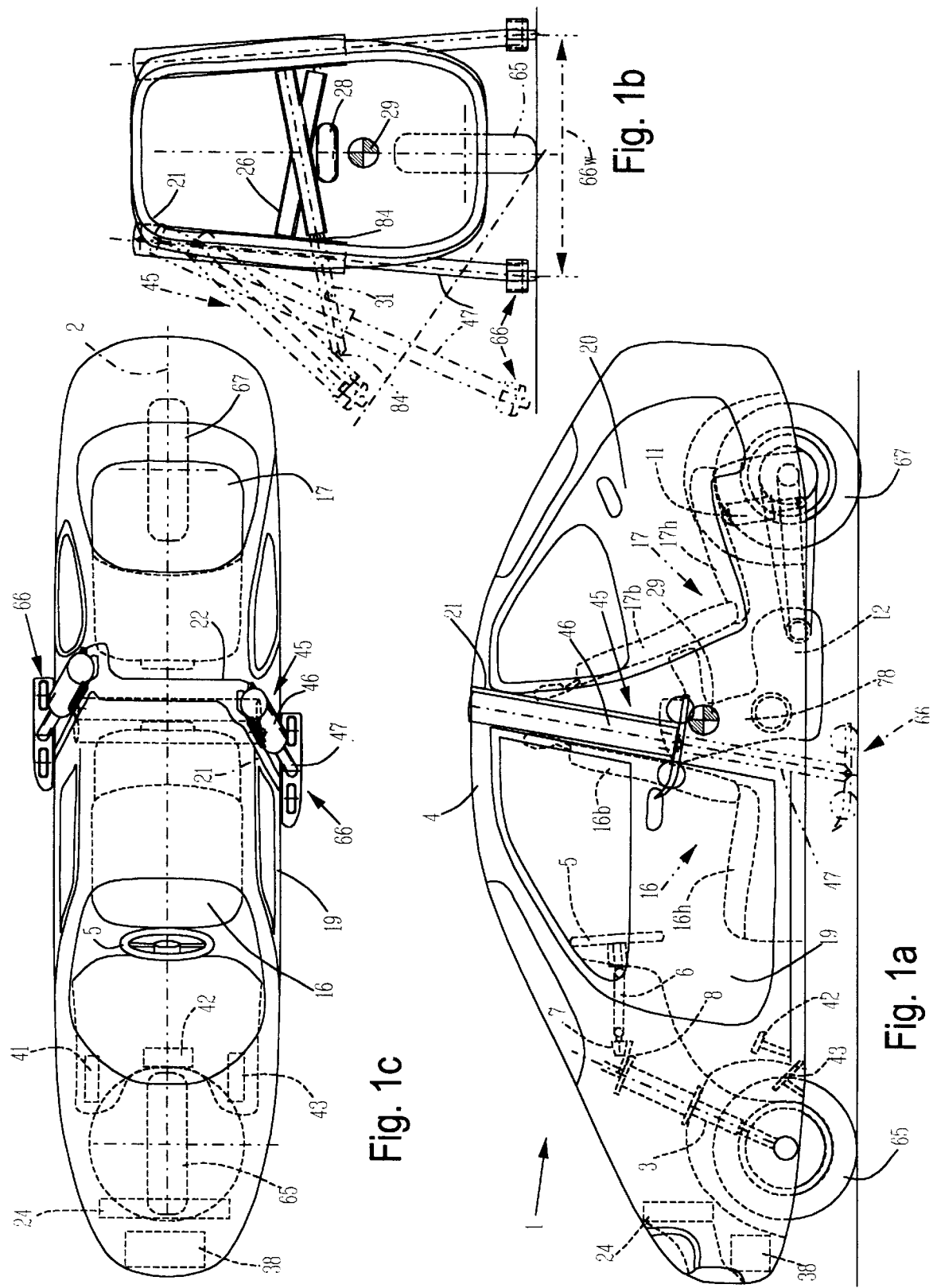
FIGS. 1a, 1b, 1c are the side elevation view, front sectional view and top plan view respectively of the vehicle's salient features and their relative positions to each other.

Referring to FIG. 1a, a side view, reveals a center-tracking vehicle designated in its entirety by reference numeral 1, with a front primary road wheel 65, and a rear primary road wheel 67 disposed in the center-line or longitudinal axis 2 of the vehicle and two outrigger devices disposed on each lateral side of the vehicle. The outrigger devices are comprised of a ski-roller assembly 66 mounted on the lower end outrigger strut 45 on each side of the vehicle. Outrigger strut 45 is made of a cylinder 46 wherein slidingly fitted a piston 47 allowing outrigger strut 45 to shorten or lengthen linearly. Advantages of the ski-roller versus a small outrigger wheel as in prior art include the ability to retract the ski-roller higher upward than possible with a single outrigger wheel mounted in caster, and that the ski-roller 66 does not sink as much as a small wheel does when running on snow, sand, or soft ground. Cylinder 46 is supported from the roof 4 of the vehicle on each side by being attached to pillars 21 vertically disposed on each side of the vehicle with mechanism to be detailed later. The two primary road wheels 65, 67 are mounted onto suspension mechanisms 3, 11, which are of the types well known in the art for supporting the wheels of a conventional motorcycle. For example, the front wheel 65 is particularly suitable for the front telescopic-fork-type of motorcycle suspension which is very easy and inexpensive to manufacture in comparison to an automobile's more complex front suspension. The rear wheel 67 is supported by a typical motorcycle's swing-arm telescopic strut design. However, the steering mechanism differs slightly from motorcycle type in that the steering wheel 5 is not directly connected to suspension fork 3, but undergoes geared reduction ratio of 4:1 or higher, in order to reduce the steering efforts at low speed and to improve precision of steering at high speed. Steering torque from steering wheel 5 is transmitted via steering shaft 6 to pinion gear 7. Pinion gear 7 is mated to larger bevel gear disk 8 which is mounted directly on top of front suspension assembly 3 thereby transmitting steering motion to front wheel 65.

Seating Arrangement

The driver sits in the front seat 16, on top of the hip-supporting surface or cushion 16h and resting his back against the back-supporting surface or back rest 16b. The passenger sits in the rear-facing rear seat 17 directly behind, supported by the rear seat cushion 17h and rear back rest 17b. It is to be noted that the rear seat 17 are significantly inclined forwardly, thereby binging the driver's head and the rear passenger's head close together for: 1) protection of the occupants' heads under pillars 21, 2) allowing for gradual aerodynamic downward-sloping of the vehicle's rear roof line and rear end 3) separating the cushions of the front seat 16h and of the rear seat 17h in order to increase the floor space between the seats for more room for engine mounting and 4) creating more space underneath the rear seat cushion 17h in order to bring the rear wheel 67 closer to the front wheel 65 thereby reducing the vehicle length. This seating arrangement allows for the shortest, lowest, yet most streamlined 2-seat center-tracking vehicle ever, in comparison to the prior art. The gas pedal 41, referring to FIG. 1c, brake pedal 42 and clutch pedal 43 are to be found in their conventional automotive positions in the drivers leg room. The driver enters and exits the vehicle via a conventional automobile style side door 19, while the passengers entry is via the forward-swinging rear door 20. In order to reduce production cost and to improve vehicle chassis rigidity, preferably the doors should be placed on only one side of the vehicle.

Engine and Transmission

As shown in FIG. *a*, the engine 78 is a motorcyle-type four-cylinder liquid-cooled in-line engine transversely mounted on the floor space between the front and the rear seat. The transmission unit 12 is adjacent to the engine block as an integral part, as in motorcycle practice. A motorcyle-type of manual transmission may be used, or, for ease of use, a light-weight and compact automatic continously variable-ratio transmission (CVT) type may be developed if these vehicles should proved to be popular. Power from transmission unit 12 is transmitted to the rear wheel 67 via steel chain as in motorcycle practice. The radiator 24 is placed in the front section of the vehicle in order to provide a convenient heat source for the cabin and for windshield defrosting. The battery 38 may also be placed in the front section as in automotive practice for more even weight distribution between the front and the rear wheels.

Outrigger Mechanism Overview

In FIG. 1b, which is a front sectional view of the vehicle, there is shown the mechanical details of the retractable outrigger mechanism. The top portions of outrigger struts 45 are attached to pillars 21 on both sides of the vehicle in such a way that they are able to slide up and down on the pillars 21 when swung outwardly. Swinging action of the outrigger strut 45 is provided by a pair of horizontally oriented hydraulic jack 26. Both ends of horizontal jack 26 is welded to pillars 21 on each side, serving as cross-member structural component of the vehicle and protecting the driver from being crushed when the vehicle is being hit from the sides. The piston ends 31 of the horizontal jacks 26 are attached via a hinged mechanism 84 to the lower end of the cylinder 46 of outrigger strut 45. Since the length of the cylinder 46 is constant, it follows that the cylinder 46 must be able to slide down on the pillars in order for the piston end 31 of horizontal jack 26 to move outward, forming a triangle.

The outrigger ski-roller assembly 66 may be retracted upward past the center of gravity (CG) 29 of the vehicle so that even if the vehicle should accidentally fall flat on its side on the ground, the outrigger mechanism is still able to get the vehicle upright. This is accomplished as follow: 1) first, the vertical outrigger strut will shorten maximally, 2) then horizontal jack 26 will expand by either force of hydraulic fluids from a hydraulic pump or force of compressed gas stored in cylindrical tank 28 disposed right next to the horizontal jacks 26. Details of hydraulic system and pneumatic system will be subsequently discussed in FIG. 3. Expansion of horizontal jack 26 will cause the vehicle to rise up to about 50 degrees from the ground. At this point, expansion of the vertical strut assembly 45 will further raise the vehicle further upward to about 80 degrees. Then, contraction of the horizontal jack 26 will bring the vehicle up to a 90 degrees vertical. In actual use, the driver would be able to quickly deploy the outrigger mechanism in order to "catch" the vehicle before it falls completely on its side. Therefore, the previously mentioned scenario rarely ever happens. However, it is very important for the driver to have complete confidence in his machine's stability and safety for the complete pleasure of motoring.

FIG. 1b also shows that by expansion of the horizontal jack 26 with the vehicle in the upright position, the outrigger ski-roller's track width 66w, defined as the transverse distance between the outrigger ski-rollers 66, is increased for more stability while driving in poor road condition or in high cross wind. In normal use, the outrigger ski-rollers' track width 66w are kept to a minimum by being tucked neatly adjacent to the vehicle's body width or body sides.

FIG. 1c represents a top plan view of the vehicle, confirming the locations of the vertical outrigger struts 45, outrigger ski-rollers 66, side pillars 21, cross bar 22 for the pillars and the roof, steering wheel 5, front wheel 65, rear wheel 67, front seat 16, rear seat 17, gas pedal 41, brake pedal 42, clutch pedal 43, radiator 24, and battery 38.

Closed-Up Mechanical Details of the Outrigger Mechanism

Figure 2:
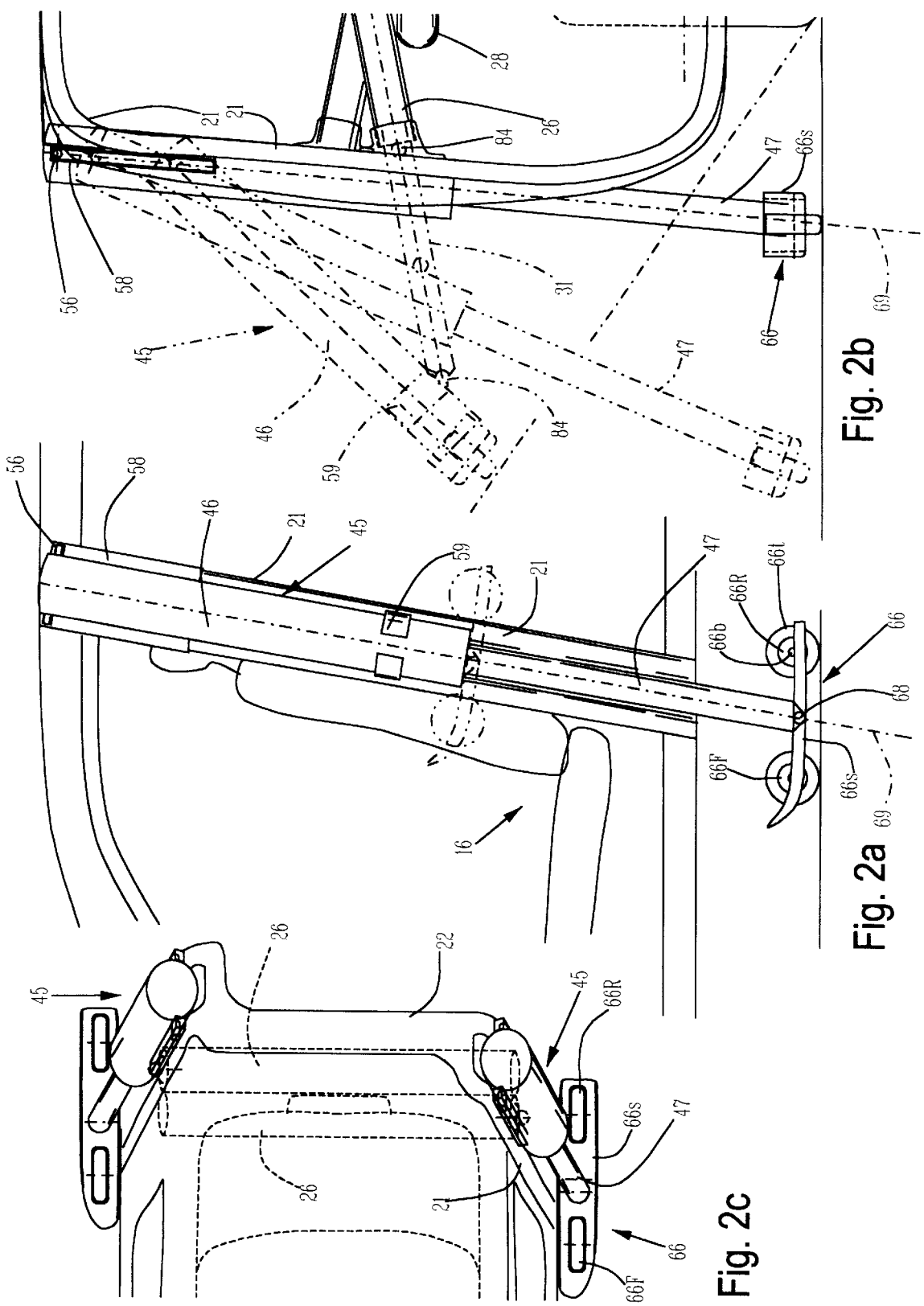
FIGS. 2a, 2b and 2c show closed-up mechanical details of the vehicle's outrigger device in its side elevation view, front sectional view and top plan view respectively.

FIGS. 2a–c show close-up mechanical details of the outrigger strut mechanism in three different perspectives. In FIG. 2a, which a side-elevation view, there is shown the outrigger ski-roller 66 pivotably mounted to the end of the piston 47 of the outrigger strut 45 on hinge joint 68. Hinge joint 68 allows ski-roller unit 66 to pivot up and down in respond to uneven road surface. The outrigger ski-roller 66 is free to swivel on the long axis 69 of the outrigger strut 45 because the piston 47 is free to rotate within cylinder 46. Ski-roller 66 is made of an elongated flat surface having an upwardly curled tip or a small ski 66s, in which a front roller wheel 66f and a rear roller wheel 66r protrude through a slot cut out on the surface of the ski 66s. The roller wheels are rotatably mounted to ski 66s via bearings 66b. In order to keep the ski-roller assembly aligned to the direction of travel of the vehicle, it is necessary to make the tire 66t of the rear roller wheel 66r out of material with high friction coefficient such as rubber and the front roller wheel 66f should be made out of low friction materials such as nylon or metal. The increase in road grip of the rear roller wheel 66r will ensure that it will always be dragged behind the front roller wheel 66f. To reduce stress on the fragile outrigger struts unit 45, a very effective suspension and shock absorption means for the outrigger ski-roller that automatically varies in stiffness in response to vehicle speed is provided. When the vehicle is standing still, the outrigger's suspension system is electrically deactivated therefore outrigger strut assembly is incompressibly stiff, thereby allowing great stability for the driver to enter or exit the vehicle. With the slowest forward motion detected by the vehicle's speedometer, however, the suspension system is activated but the suspension is still relatively stiff. With more forward speed, the outrigger's suspension becomes softer to anticipate higher road shock at higher speed, and also because when the vehicle is in faster motion, the outrigger stabilizing effect is needed less and less. At above certain pre-set speed, the outrigger ski-rollers are automatically retracted upward allowing the vehicle freedom to maneuver. Detailed mechanism for outrigger suspension and motive power will be presented in connection to FIG. 3. The top portion of FIG. 2a shows the outrigger strut 45 being attached to the vehicle pillar 21 via roller 56 slidably fitted inside roller guide 58 which is welded or bolted to the vehicle pillar 21.

FIG. 2b represents a front sectional view of the outrigger system. Above the ski-roller 66, the outrigger strut 45 is shown in various deployed position with expansion of the horizontal jack 26. Please note that jack 26 is angled slightly downward in its piston 31 end in order to push ski-roller 66 down as it expands thereby making up for the lost in height of the vertical outrigger strut as it is being swung outward. Jack 26 is firmly attached to pillars 21 on each of its ends and serve as structural cross member of the vehicle. The end of piston 31 of jack 26 is shown attached to the outrigger cylinder 46 via hinge joint 84 and bracket 59. Bracket 59 wraps tightly around lower end of cylinder 46. The top portion of FIG. 2b shows roller 56 in various alternative positions as it slides within roller guide 58 which is attached to pillar 21.

FIG. 2c represents a top-down plan view of the outrigger strut mechanism, confirming the relative locations of each component. A pair of pillars 21 are seen flanking each side of outrigger strut 45, and the pillars on each lateral sides of the vehicle are joined at the top by pillar cross bar 22. Horizontal hydraulic jacks 26 are seen bracing pillars 21 on each side mid level in the vehicle.

Electromechanical Control Connections and Hydraulic System

Figure 3:
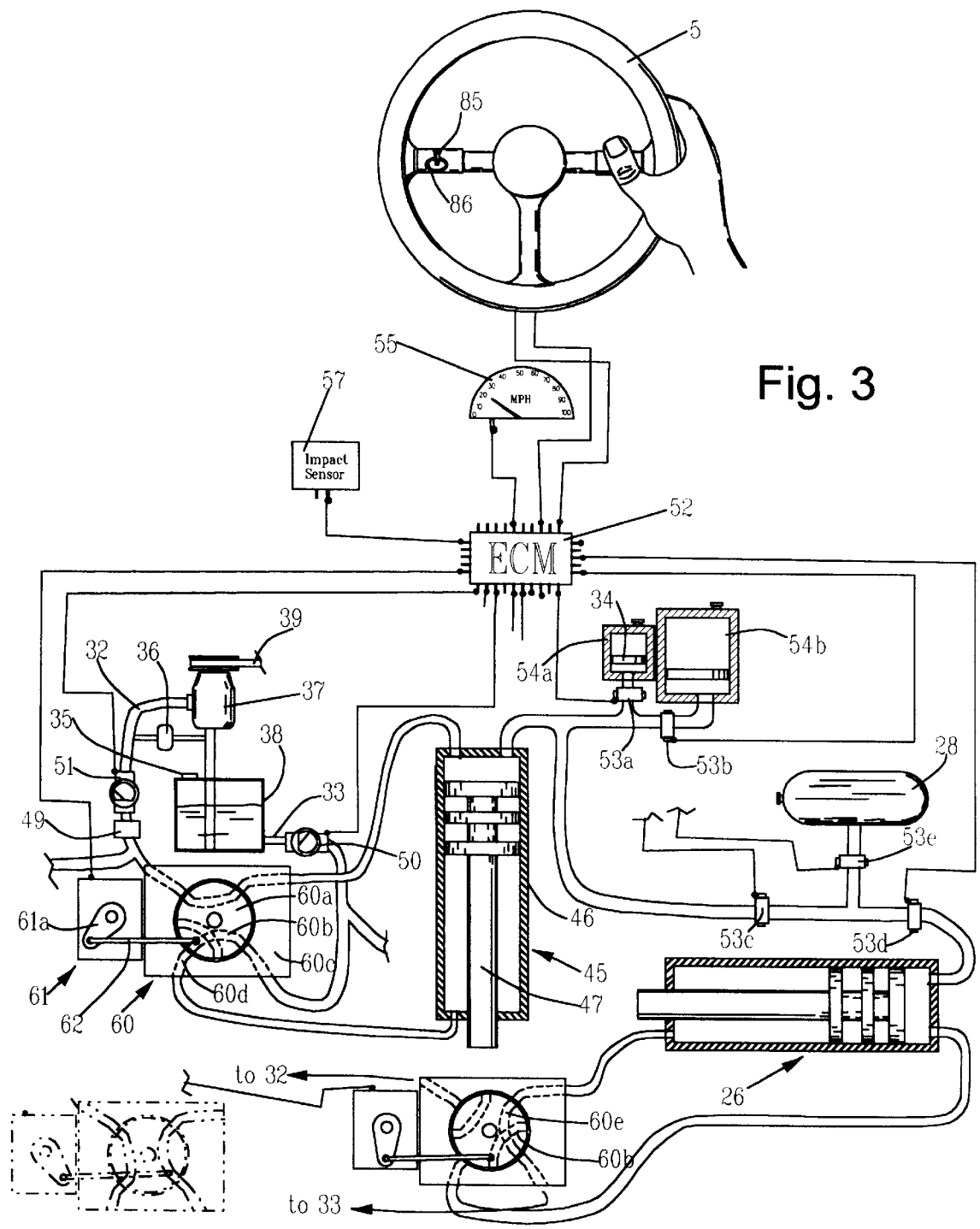
FIG. 3 is a schematic diagram of the actuation and control-hookup of the electromechanical hydraulic mechanism of the vehicle's outrigger system.

FIG. 3 is a schematic diagram showing the control system, suspension system and powering of the outrigger system. The vertical outrigger strut 45 and the horizontal jack 26 are powered by hydraulic fluids stored in hydraulic fluids reservoir 38 and supplied under pressure by hydraulic pump 37 which in turn is powered by the engine via belt drive 39 or alternatively by an electric motor (not shown). Central control means of all these system is done electronically by the vehicle electronic control module (ECM) 52. The high pressure outlet line 32 of the hydraulic pump 37 is connected to both vertical strut 45 and horizontal jack 26 by hydraulic lines, and this connection is interrupted by reversing rotary valve 60. Pump 37 is protected by pressure regulator 36 as commonly used in hydraulic system in order to prevent excess pressure built up. Reversing valve 60 is comprised of a solid casing 60c through which multiple flow channels 60d are formed. In the center of solid casing 60c is a cylindrical rotor 60a that is tightly fitted to corresponding cylindrical space machined into casing 60c. Rotor 60a also contains a multiple of flow channels 60b that is formed within, such that depending on the rotational position of rotor 60a, the flow of fluids from pump 37 may be directed to the top of cylinder 46 pushing piston 47 downward, in turn, the fluids on bottom of cylinder 46 is allowed to exit through rotary valve 60 to the fluids reservoir 38. Or, by rotating rotor 60a ninety degrees, as shown in phantom lines in the page corner, the flow of fluids is now reversed, and the flow of fluids from pump 37 is now directed toward the bottom of cylinder 46 and pushing piston 47 upward while the top of cylinder 46 is simultaneously connected to fluids reservoir 38 allowing fluids to exit thereto. Electronic flow meter 51 placed between rotary valve 60 and pump 37 and in hydraulic connection to either ends of cylinder 46, is used to determine the position of the piston 47 relative to cylinder 46, and as piston 47 has reached the end of its travel accompanied by the flow rate approaching zero, flow meter 51 will signal ECM 52 to close off valve 60 thus locking piston 47 in place. Rotational movement of rotor 60a is done by electric servo 61 electrically linked to ECM 52. Servo arm 61a is linked to a push rod 62 that is linked to rotor 60a. Rotation of rotor 60a only fourty-five degrees, as shown on the bottom center of the page, will completely interrupt fluid connection from the pump to the top of the cylinder, causing piston 47 to be hydraulically locked in a fixed position within cylinder 46, however, the bottom compartment of the cylinder is still in fluids connection to reservoir 38 via channel 60e within rotor 60a.

Suspension Means for Outrigger Struts

This rigid hydraulic locking is important when the vehicle is parked, in order to prevent the vehicle from leaning too much on one side potentially leading to falling on its sides in cross wind or when the occupants step into the vehicle. However, when the vehicle is in slow forward motion, the outrigger strut 45 must have suspension property, albeit fairly stiff, in order to reduce stress to its fragile structure at the same time lends some support to keep the vehicle upright. Also, when the vehicle is riding on top of a convex surface, a rigid outrigger strut will prevent one of the two main wheels 65, 67 of the vehicle from touching the ground thus causing lost of traction control, at the same time the outrigger struts will bear most of the weight of the vehicle because they are placed very dose to the vehicle's center of gravity 29. This does not bode well for the fragile nature of the telescopic outrigger strut which will bend or break. Providing for suspension for the outrigger strut 46 and the horizontal jack 26 is a small size air chamber 54a, disposed in fluid connection with the top ends of the outrigger strut cylinder 46 and to jack 26. This chamber 54a contains air or an inert gas at atmospheric pressure or not much higher. Still, a moveable partitioning plate 34 is desirable in order to prevent escape of gas inside chamber 54 to the hydraulic line. Interrupting the fluid connection between chamber 54a and cylinder 46 is a solenoid flow-control valve 53a, which opens or closes under signal from the ECM 52, in order to activate the suspension system or deactivate it. Also connected in parallel to air chamber 54a is larger air chamber 54b, but is similarly constructed. Another solonoid valve 53b controls the flow in or out of chamber 54b, and this valve opens at higher vehicle speed when softer suspension with higher range of travel is desirable.

Rapid or Emergency Deployment of Outrigger Struts

For rapid deployment of outrigger struts in case of emergency, a faster means must be provided than by hydraulic pump 37. Also, since hydraulic pump 37 is powered by the engine 78, a backup means is desirable in case of engine failure. Therefore, it is highly desirable to use the stored energy of a compressed inert gas in tank 28 for rapid emergency deployment. High pressure tank 28 is connected to the top ends of vertical strut cylinder 46 and horizontal jack 26. Solonoid valve 53*e* is used to control flow directly out of tank 28, while valve 53*c* controls flow to vertical strut cylinder 46 while valve 53*d* controls gas flow to horizontal cylinder 26. Valves 53*c* and 53*d* are normally kept open, unless when valve 53*e* is opened, in which case, either valve 53*c* or 53*d* will have to be closed to allow for selective movement of either horizontal or vertical cylinder. With opening of solonoid valves 53*e* and 53*c* and with rotary valve 60 set in cooperative position as shown on the bottom center of the page, the gas flows from tank 28 to the top of cylinder 46 pushing piston 47 downward and moving hydraulic fluids on the bottom part of cylinder 46 back to fluid reservoir 38. To prevent high pressure gas from going toward the hydraulic pump via outlet line 32, an unidirectional flow valve 49 is serially placed on hydraulic line 32, thereby preventing the gas from backing up into the hydraulic pump 37. Flow meter 50 installed on the hydraulic return line 33 will keep account of the rate of fluids flowed past, and as piston 47 reaches its end of travel, the flow rate goes to zero and flow meter 50 will signal the ECM 52 to close solonoid valve 53*e* thereby conserving pressure in tank 28. If however, higher gas pressure is desirable in cylinder 46, the driver can signal the ECM 52 via switch means to reopen solonoid valve 53*e* again, thereby allowing more pressure from tank 28 to enter cylinder 46. To move piston 47 back to the upward position, rotary valve 60 is activated causing hydraulic fluids to enter the bottom of cylinder 46. This in turn allows gas on top of piston 47 to escape via the fluid return line 33 toward the fluid reservoir 38 where the gas will escape to the atmosphere via vent 35. In order to reduce manufacturing cost, most of the valves herein described may be grouped together into a metal casting valve assembly unit (not shown) similar to the control valve assembly in automatic transmission unit.

Thumbstick Control

Referring to the top of FIG. 3, switch means is available for the driver to selectively deploy any of the 4 hydraulic cylinders. Mounted on each sides of steering wheel 5 is a mini thumbstick control 85 (or thumb pad as in electronic games) mounted on a round gimbal 86. The thumbstick 85 is movable in all directions. When thumbstick 85 is moved in lateral directions, toward the inside or toward the outside, horizontal jack 26 is activated causing swinging motion of outrigger strut in order to increase or decrease the outrigger wheel track width. When thumbstick 85 is moved forward or backward, lowering or retraction of outrigger wheels occured, respectively. When moved in a diagonal direction, simultaneous activation of both hydraulic cylinders 45 and 26 is possible. Thumbstick 85 is kept centered in its neutral position by returning springs (not shown) mounted inside gimbal 86. When thumbstick 85 is moved only a small amount, only rotary valve 60 is activated, causing only slow movement of the activated hydraulic cylinder. When thumbstick 85 is moved near its extreme range, however, solonoid valve 53*e* is opened along with either valve 53*c* or 53*d*, causing discharge of high pressure gas into respective hydraulic cylinder resulting in rapid movement of that cylinder's piston in response to emergency needs.

Automatic Deployment of the Outrigger Struts

In normal use, the driver hardly ever needs to touch thumbstick (or thumb pad) 85, as retraction and lowering of outrigger ski-rollers 66 and activation or deactivation of the suspension mechanism is done automatically according to the vehicle speed as measured by speedometer 55 which is connected to the ECM 52. As mentioned in previous section, the stiff suspension mode for the outrigger ski-rollers is activated at the first sign of any forward vehicle speed by opening of valve 53*a*, and as the speed reaches above 3–5 mph (4.88 km/h) a softer suspension mode is activated by opening of valve 53*b* and dosing of valve 53*a*, and as speed reaches above 7 mph (11.2 km/h) both valves 53*a* and 53*b* are opened, causing even softer suspension. Upward retraction of outrigger ski-rollers 66 begins at speed above 10 mph (16 km/h), and as the vehicle moves faster, the outrigger ski-rollers will be retracted higher, until it is completely retracted at a pre-set cruise speed. The reverse is true when the vehicle decelerates. Determination of the position of outrigger ski-rollers is done by flow meters 50 and 51, by measing the flow volume passing it at the start of the signal to retract the wheel 66. An optional impact sensor 57 connected to the ECM 52 may be provided in order to rapidly lower the outrigger ski-rollers 66 and to increase their track width in the event of a collision, thus preventing the vehicle from fallen down and being "run-over" by other vehicles. The outrigger struts 45 and the horizontal jack 26 may need be deployed only partially in most cases in order to minimize the chance of it being caught onto by oncoming traffics.

Scope and Ramification

As anyone in this field of art can quickly notice, there are many different adaptations to the principle herein disclosed. For example, the vehicle's energy efficiency also lends well to economical use of battery powered electric motor for propulsion. A major reason for the high purchasing and operating costs of electric automobile is due to the expensive battery which must be frequently replaced, and expensive amount of power semiconductor electronics used in motor control. A very small size and very energy efficient vehicle significantly reduces the size of the motor, the battery and of power semi-conductor electronics. The limited range of electric vehicles is of little consequence for a vehicle intended for daily commuting, and a small size battery can be recharged very quickly, unlike larger battery in electric cars. Another appealing reason for the use of electric power in this very slim and compact vehicle is that it may be used in-door in large shopping malls, in large industrial plants, school campuses, bike trails, narrow back-door alleys in large cities, or wherever that is considered off-limit for the automobiles.

Therefore, the scope of the invention should be determined by the appended claims and their legal equivalents, rather by the examples herein given.

What is claimed is:

1. In a motor vehicle which has a body defining an operator's compartment flanked by two lateral body sides, a front and a rear primary road wheels arranged in tandem along a longitudinal axis of the vehicle, a center of gravity, and a body width, the combination comprising:

outrigger struts mounted on each side of said vehicle, each of said struts having at least two elongated component slidingly attached serving as an upper end and a lower end of said strut, for supporting said vehicle during period of insufficient forward speed, means for shortening and lengthening of said struts thereby moving said lower ends of said struts to a retracted position upon the vehicle reaching adequate forward speed and to a lowered position upon the vehicle nearing standing still, ski-roller mounted to the lower end of each of said struts for stable support and reduction of friction in soft surface as well as hard surface, each of said ski-roller is comprised of an elongated surface having an upwardly-sloped front end for upholding said vehicle in soft supporting surfaces and at least one roller wheel rotatably mounted onto said elongated surface and protruding below said elongated surface for reducing friction and wear in hard supporting surfaces.

2. The combination of claim 1 wherein said ski-roller is comprised of a front roller wheel and a rear roller wheel in tandem relationship rotatably mounted to said elongated surface, leaving a center space between said roller wheels for attachment to the lower end of the outrigger strut.

3. The combination of claim 2 wherein said ski-roller is pivotably mounted to the lower end of the outrigger strut allowing said ski-roller to swivel horizontally in order to allow said ski-roller to be put in caster for alignment with the vehicle's direction of travel.

4. The combination of claim 3 wherein the rear roller wheel has significantly higher contact friction to the supporting surface than the front roller wheel, thereby allowing the ski-roller to align to the vehicle's direction of travel by ensuring that the rear roller wheel is always dragged behind.

5. The combination of claim 1 further comprising:
mounting means for pivotably mounting said outrigger strut to a respective lateral side of the vehicle, allowing swinging movement of said strut in a plane perpendicular to the longitudinal axis of the vehicle,
swinging means for swinging said strut in said perpendicular plane, between a first position wherein the ski-rollers are generally adjacent to the vehicle body width for maximal conservation of roadway and parking space and a second position wherein said ski-rollers are further spread apart at a significant horizontal distance away from respective lateral body sides for use when extra stability is required such as on uneven, sloped or slippery surfaces, or during strong cross winds, and,
suspension and shock absorption means for said outrigger struts in order to protect said struts and said mounting means for said struts from damaging impacts.

6. The combination of claim 5 wherein said mounting means for pivotably mounting said outrigger strut to a respective lateral side of the vehicle is disposed sufficiently high in said vehicle allowing the outrigger ski-rollers to be retracted to a resting position, said resting position is at a predetermined vertical distance from said vehicle's center of gravity enabling said outrigger ski-rollers to restore said vehicle back to a predominantly upright attitude should said vehicle fall laterally, and whereas said swinging means is sufficiently powered to be capable of lifting said vehicle from a first position wherein said vehicle assumes a predominantly horizontal attitude with respect to the supporting surface to a second position wherein said vehicle is in a generally upright attitude.

7. The combination of claim 1 wherein:
each of the outrigger strut is comprised of a piston in the lower end wherein mounted said ski-roller, and a cylinder in the upper end in telescopic engagement, whereby means for vertically moving said lower ends of said struts is by a noncompressible hydraulic fluid supplied by a hydraulic pump acting upon said piston from an upper compartment of said cylinder for pushing said piston downward and from a lower compartment of said cylinder for pushing said piston upward.

8. The combination of claim 7 wherein suspension means is provided for said outrigger struts, said suspension means comprises of at least one chamber containing a compressible fluid in hydraulic connection with the upper compartment of said cylinder serving as suspension means by providing a progressively increasing resisting force corresponding with progressively upward displacement of said piston relative to said cylinder, said suspension means has a predeterminable degree of stiffness characterized by a change in magnitude of said resisting force as a function of a change in linear displacement of said piston within said cylinder.

9. The combination of claim 8 further comprises:
valve means in serial connection between said compressible-fluid chamber and the upper compartment of said cylinder for controlling said hydraulic connection,
controlling means linked to said valve means to interrupt said hydraulic connection, thereby capable of turning on and off said suspension means of the outrigger strut,
speed-sensing means for sensing horizontal speed of said vehicle, said speed-sensing means is linked to said controlling means whereby said suspension means is turned off by causing a hydraulic-lock condition when the vehicle is parked and turned on when the vehicle has reached a predetermined horizontal speed.

10. The combination of claim 8 wherein said suspension means has a means for varying the degree of stiffness thereof, in order to maintain stability to the vehicle at different forward speeds and to prevent damage to the outrigger strut, further comprising:
a plurality of said compressible-fluid chamber in interruptable hydraulic connection to the upper compartment of said cylinder,
a plurality of valve means to provide for said interruptable hydraulic connection between each of said compressible-fluid chamber and the upper compartment of said cylinder,
controlling means linked to said valve means capable of interrupting a varying number of said chambers from the upper compartment of said cylinder, thereby varying the stiffness of said suspension means.

11. The combination of claim 7 wherein the outrigger struts has a means for rapid change in length by a high-pressure gas as an alternative to the hydraulic pump, further comprising:
a container capable of storing a gaseous material at high pressure in interruptable fluid connection to at least one compartment of the outrigger struts cylinder, from a set made of the upper compartment and the lower compartment of the outrigger strut's cylinder,
gas-flow controlling valve for interrupting said fluid connection between said container and said compartment of said cylinder,
valve controlling means linked to said gas-flow controlling valve for releasing high pressure gas into said compartment of said outrigger's cylinder for emergency lowering of the outrigger's ski-roller.

12. The combination of claim 7 wherein determination of relative position of the piston with respect to the cylinder of the outrigger struts is done via electronic flow meter, further comprising:
electronic flow-measuring means in serial hydraulic connection with at least one end of the hydraulic outrigger strut, for producing an electrical signal corresponding to an amount of fluid flowing through,
electronic information processor within said vehicle for translating said electrical signal from said electronic flow-measuring means into information on actual position of the piston relative to the cylinder of the outrigger strut.

13. In a motor vehicle which has a front wheel and a rear wheel arranged in tandem along a longitudinal axis of the vehicle, the combination comprising:

- at least one outrigger wheel rotatably mounted and disposed bilaterally on each side of said vehicle,
- hydraulic struts linked to said outrigger wheels for raising said outrigger wheels to a retracted position upon the vehicle reaching adequate forward speed and lowering said outrigger wheels to a lowered position upon the vehicle nearing standing still, each of said hydraulic strut is comprised of a piston telescopically fitted within a cylinder, whereby means for moving said piston relative to said cylinder is by force of a non-compressible hydraulic fluid supplied by a hydraulic pump acting upon said piston from an upper compartment of said cylinder for pushing said piston downward and from a lower compartment of said cylinder for pushing said piston upward,
- suspension means to resiliently couple said outrigger wheels to said vehicle, comprising of at least one chamber containing a compressible fluid in hydraulic connection with the upper compartment of said cylinder serving as suspension means by providing a progressively increasing resisting force corresponding with progressively upward displacement of said piston relative to said cylinder, said suspension means has a predeterminable degree of stiffness characterized by a change in magnitude of said resisting force as a function of a change in linear displacement of said piston within said cylinder.

14. The combination of claim 13 further comprises:

- valve means in serial connection between said compressible-fluid chamber and the upper compartment of said cylinder for controlling said hydraulic connection,
- controlling means linked to said valve means to interrupt said hydraulic connection, thereby capable of turning on and off said suspension means of the outrigger strut,
- speed-sensing means for sensing horizontal speed of said vehicle, said speed-sensing means is linked to said controlling means whereby said suspension means is turned off by causing a hydraulic-lock condition when the vehicle is parked and turned on when the vehicle has reached a predetermined horizontal speed.

15. The combination of claim 13 wherein said suspension means has a means for varying the degree of stiffness thereof, in order to maintain stability to the vehicle at different forward speeds and to prevent damage to the outrigger strut, further comprising:

- a plurality of said compressible-fluid chamber in interruptable hydraulic connection to the upper compartment of said cylinder,
- a plurality of valve means to provide for said interruptable hydraulic connection between each of said compressible-fluid chamber and the upper compartment of said cylinder,
- controlling means linked to said valve means capable of interrupting a varying number of said chambers from the upper compartment of said cylinder, thereby varying the stiffness of said suspension means.

16. The combination of claim 13 wherein the hydraulic struts have a means for rapid change in length by a high-pressure gas as an alternative to the hydraulic pump, further comprising:

- a container capable of storing a gaseous material at high pressure in interruptable fluid connection to at least one compartment of the hydraulic strut cylinder, from a set made of the upper compartment and lower compartment of the hydraulic strut cylinder,
- gas-flow controlling valve for interrupting said fluid connection between said container and said compartment of said cylinder,
- valve controlling means linked to said gas-flow controlling valve for releasing high pressure gaseous material into said compartment of said hydraulic strut cylinder for emergency lowering or retraction of the outrigger wheels.

17. The combination of claim 13 wherein determination of a relative position of the piston within the cylinder of the hydraulic strut is done via electronic flow meter, further comprising:

- electronic flow-measuring means in serial hydraulic connection with at least one end of the hydraulic strut, for producing an electrical signal corresponding to an amount of fluid flowing through,
- electronic information processor within said vehicle for translating said electrical signal from said electronic flow-measuring means into information on actual position of the piston relative to the cylinder of the hydraulic strut.

* * * * *